(12) United States Patent
Imano

(10) Patent No.: US 6,473,217 B2
(45) Date of Patent: Oct. 29, 2002

(54) DIAPHRAGM DEVICE

(75) Inventor: Seiichi Imano, Narashino (JP)

(73) Assignee: Seiko Precision Inc. (JP)

( * ) Notice: Subject to any disclaimer, the term of this patent is extended or adjusted under 35 U.S.C. 154(b) by 65 days.

(21) Appl. No.: 09/777,105

(22) Filed: Feb. 5, 2001

(65) Prior Publication Data
US 2001/0014223 A1 Aug. 16, 2001

(30) Foreign Application Priority Data

Feb. 3, 2000 (JP) .......................................... 2000-025817

(51) Int. Cl.$^7$ ............................................... G02B 26/02
(52) U.S. Cl. ........................ 359/227; 359/230; 396/449; 396/463; 396/485; 396/494
(58) Field of Search ................................ 359/227, 230, 359/232–235; 396/449, 452, 458–464, 484–486, 509–510, 523

(56) References Cited

U.S. PATENT DOCUMENTS 6,343,881 B1 * 2/2002 Yaginuma .................... 396/449

* cited by examiner

Primary Examiner—James Phan
(74) Attorney, Agent, or Firm—Adams & Wilks

(57) ABSTRACT

The space required in the vicinity of a shutter aperture can be reduced to achieve an overall reduction in size of a device by providing a diaphragm mechanism for covering the shutter aperture formed of a plurality of members cooperating with each other to cover the shutter aperture. By cooperation of a small-diaphragm plate having a diaphragm aperture formed therethrough smaller in diameter than the shutter aperture and an auxiliary plate, for example, a space reduction is facilitated. The small-diaphragm plate is pivotably mounted adjacent one side of the shutter aperture. The auxiliary plate has a shape that cooperates with the convex-arcuate portion to cover the shutter aperture. When the small-diaphragm plate and the auxiliary plate are driven by the diaphragm actuating member and moved to a first position covering the shutter aperture, the two plate cooperate to fully cover the shutter aperture. In a second position retracted from the shutter aperture, the space around the shutter aperture is reduced because the small-diaphragm plate is small in size.

16 Claims, 8 Drawing Sheets

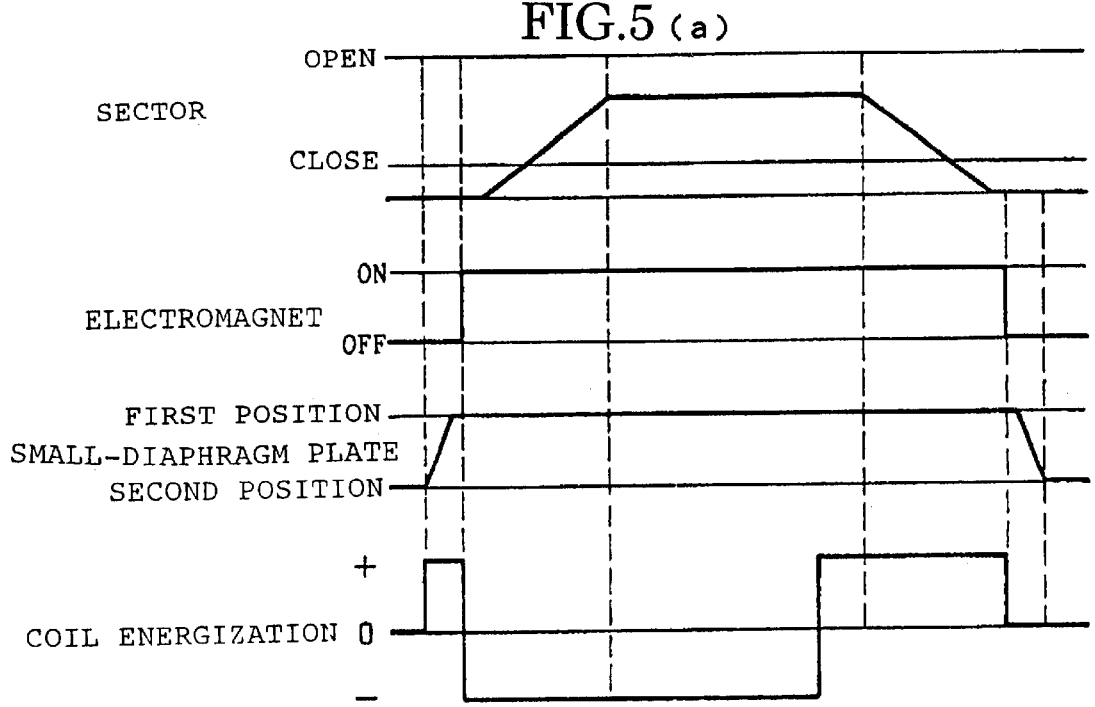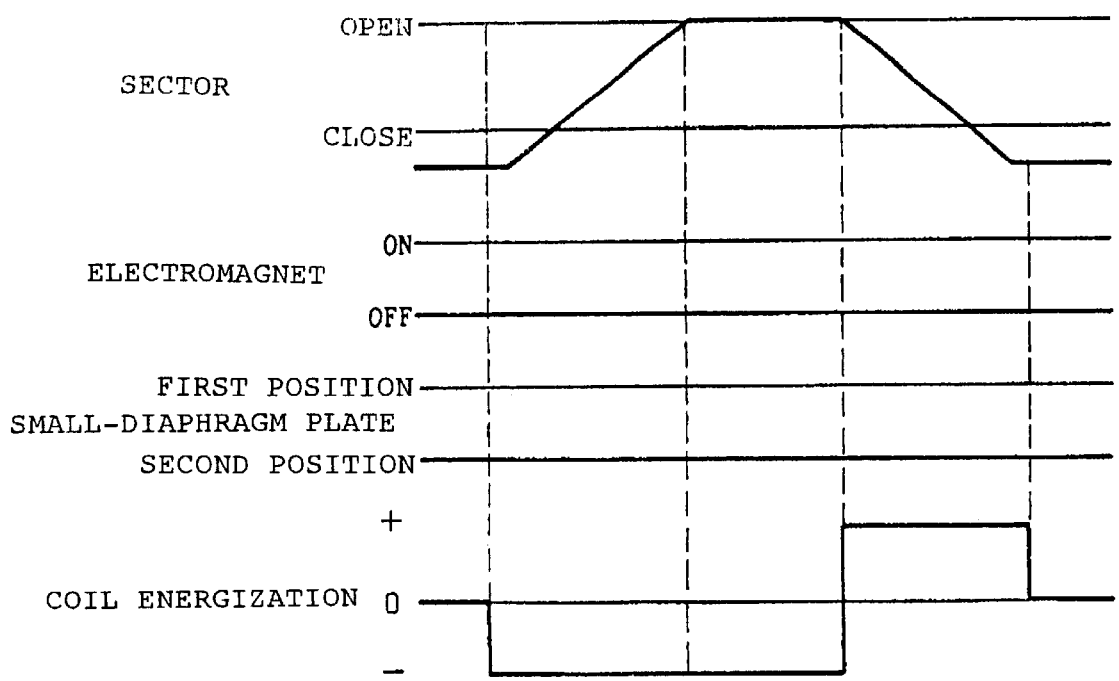

DIAPHRAGM DEVICE

BACKGROUND OF THE INVENTION

1. Field of the Invention

The present invention relates to a diaphragm device for changing a shutter aperture diameter in a step-wise manner.

2. Description of the Related Art

A known diaphragm device is described in Japanese Patent Laid-open No. 79541/1993 by the present assignee. This known diaphragm device will be explained with reference to FIG. 8.

In FIG. 8, a rotor 10 formed by a permanent magnet, a rotor actuated lever 11, a diaphragm actuating member 12 and a small-diaphragm plate 73 are pivotably supported on a main plate (not-shown) through a rotor shaft 10a, a shaft 12a and a shaft 4. The small-diaphragm plate 73 has a sufficient overall size to cover the shutter aperture 2 and has a small-diameter diaphragm aperture 73a. The small-diaphragm is pivotably supported by the shaft 4 to move between a first position A fully covering the shutter aperture 2 and a second position B fully retracted from the aperture 2. Also, the small-diaphragm plate 73 is urged in a clockwise direction in the drawing by a spring 73c and abutted against and rested on a positioning pin 5.

The diaphragm actuating member 12 is latched and biased in a counterclockwise direction in the drawing by a spring 13, and is abutted against an engagement pin 14.

When a coil L is energized to excite the stator 9, the rotor 10 rotates in a counterclockwise direction and the rotor actuated lever 11 fixed on the rotor shaft 10a also rotates in a counterclockwise direction. This rotation causes the diaphragm actuating member 12 to rotate in a clockwise direction through a rotor actuated lever pin 11a. Through a protrusion 12b of the diaphragm actuating member 12, the small-diaphragm plate 73 is rotated counterclockwise about the shaft 4 from the second position B to the first position A where it goes into abutment against a positioning pin 15. Consequently, the shutter aperture 2 is restricted by a diaphragm aperture 73a. At this time, a pin 73b fixed on the small-diaphragm plate 73 moves a movable iron piece 18 along an attraction surface of an iron core 17a. At a time that the small-diaphragm plate 73 reaches the first position A, an electromagnet 17b is excited to attract and hold the movable iron piece 18, maintaining the small-diameter diaphragm aperture 73a.

In this related-art diaphragm device, the small-diaphragm plate 73 is structured by one plate and has a sufficient size to fully cover the shutter aperture 2. Because the small-diaphragm plate 73 has a size large enough to cover the shutter aperture 2 when in the first position A, it must be moved by a large amount to the second position B to be fully retracted from the shutter aperture 2. This requires the small-diaphragm plate 73 to be dimensioned to provide a large space for retraction, resulting in an increased size in the vicinity of the shutter aperture 2.

SUMMARY OF THE INVENTION

In order to solve the above problem, a small-diaphragm plate is provided with a diaphragm aperture smaller in diameter than a shutter aperture and an auxiliary plate so that when the small-diaphragm plate is selected, the small-diaphragm plate and the auxiliary plate cooperate to cover the shutter aperture. Since the small-diaphragm plate is provided in a divided manner to cooperate with the auxiliary plate, the small-diaphragm plate can be made smaller in area than in the conventional device, making it possible to reduce the size of the diaphragm device.

A diaphragm device according to one aspect of the present invention comprises a small-diaphragm plate having a diaphragm aperture smaller in diameter than a shutter aperture and being movable between a first position at which the diaphragm aperture is positioned in the shutter aperture and a second position at which the diaphragm aperture is retracted from the shutter aperture, an auxiliary plate cooperating with the small-diaphragm plate to cover the shutter aperture, and a diaphragm actuating member for actuating the small-diaphragm plate or the auxiliary plate, wherein actuation of the diaphragm actuating member causes the small-diaphragm plate to be moved to the first position and the auxiliary plate to be moved to a first position covering the shutter aperture, and actuation of the diaphragm actuating member in the other direction causes the small-diaphragm plate to be moved to a the second position and the auxiliary plate to be moved to a second position retracted from the shutter aperture. Because the shutter aperture is covered by cooperation of the small-diaphragm plate and the auxiliary plate, the small-diaphragm plate can be made smaller than in the related device, making possible to reduce the dimensions in the periphery of a shutter.

The auxiliary plate may be positioned on a side opposite to or the same side of the shutter aperture as the small-diaphragm plate when the small-diaphragm plate is positioned in the second position. This structure improves the freedom in arrangement of parts around the periphery of the shutter.

Actuation of the diaphragm actuating member in one direction may be conveyed through the small-diaphragm plate to the auxiliary plate to move both in unison or may be conveyed through the auxiliary plate to the small-diaphragm plate to move both in unison. This structure improves the shape and freedom of the arrangement of parts. Also, the diaphragm actuating member if driven by a motor will achieve automation of the diaphragm device.

BRIEF DESCRIPTION OF THE DRAWINGS

FIG. 5A is a time chart showing operation of each member in the case the first program is selected, and FIG. 5B is a time chart showing operation of each member in the case the second program is selected;

DETAILED DESCRIPTION OF THE PREFERRED EMBODIMENTS

Figure 8:
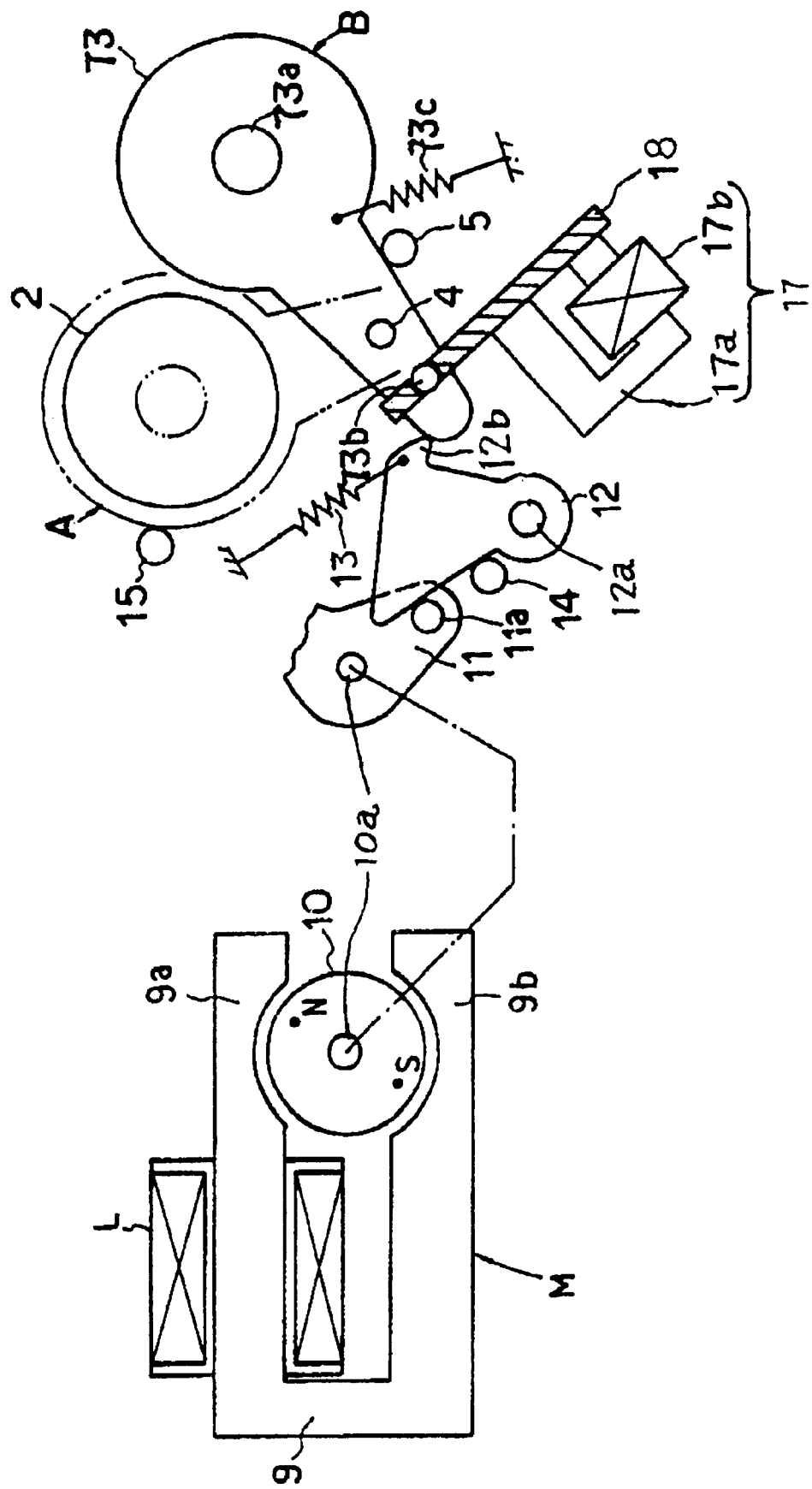
FIG. 8 is a front view showing an initial state prior to actuation of the shutter in a related art.

Embodiments of the present invention will be explained with reference to the attached drawings. In the explanation, the same or similar parts as those of the related structure explained in FIG. 8 are denoted by the same reference numerals.

Figure 1:
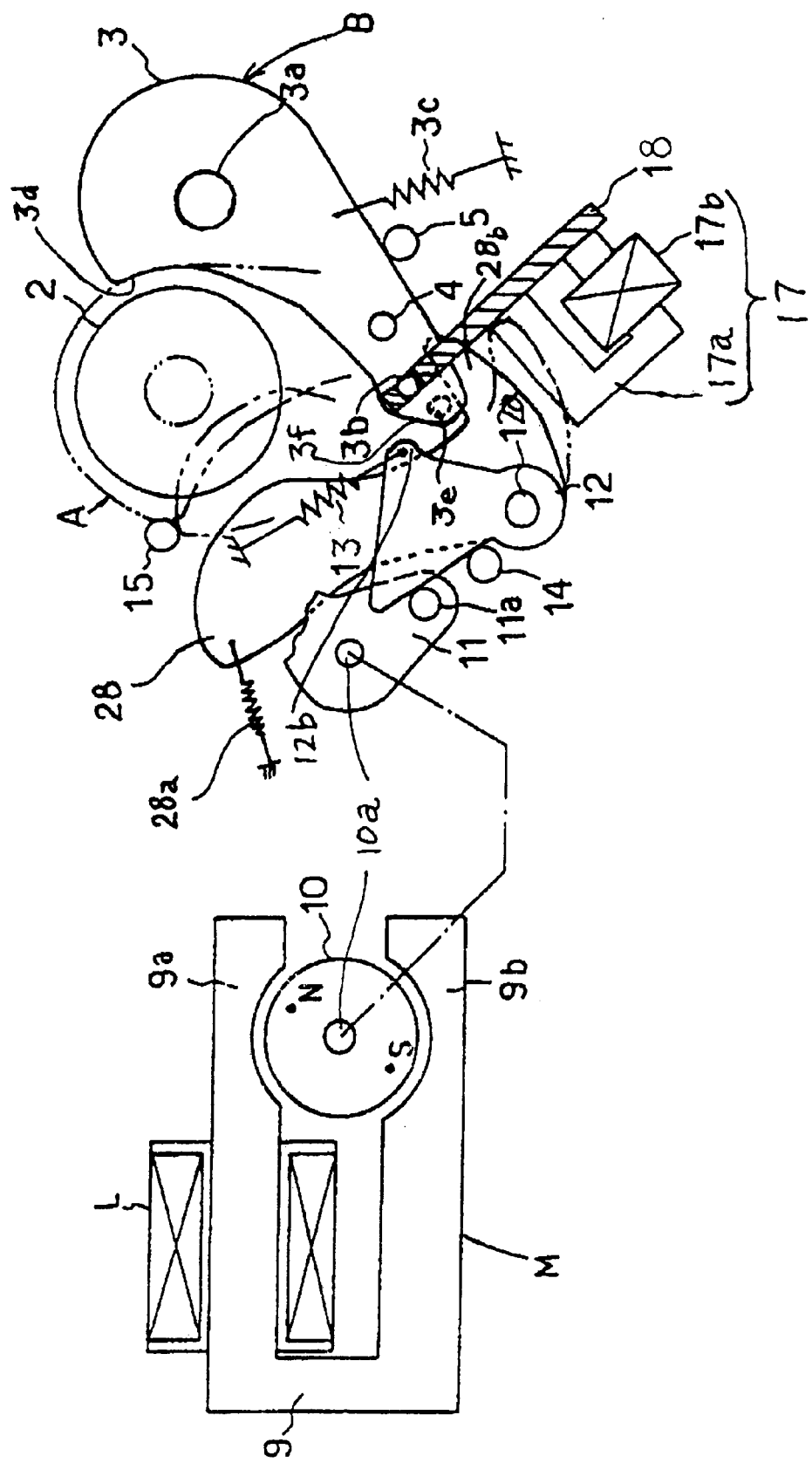
FIG. 1 is a front view showing an initial state prior to actuation of the shutter to which is applied a diaphragm device showing one embodiment of the present invention.

In FIG. 1, a stator 9, a rotor 10 and a coil L constitute a swing motor M. On the stator 9, an N pole and an S pole are generated by energizing to the coil L having magnetic pole portions 9a, 9b. This enables the rotor 10 to rotate in both forward and reverse directions.

Figure 2:
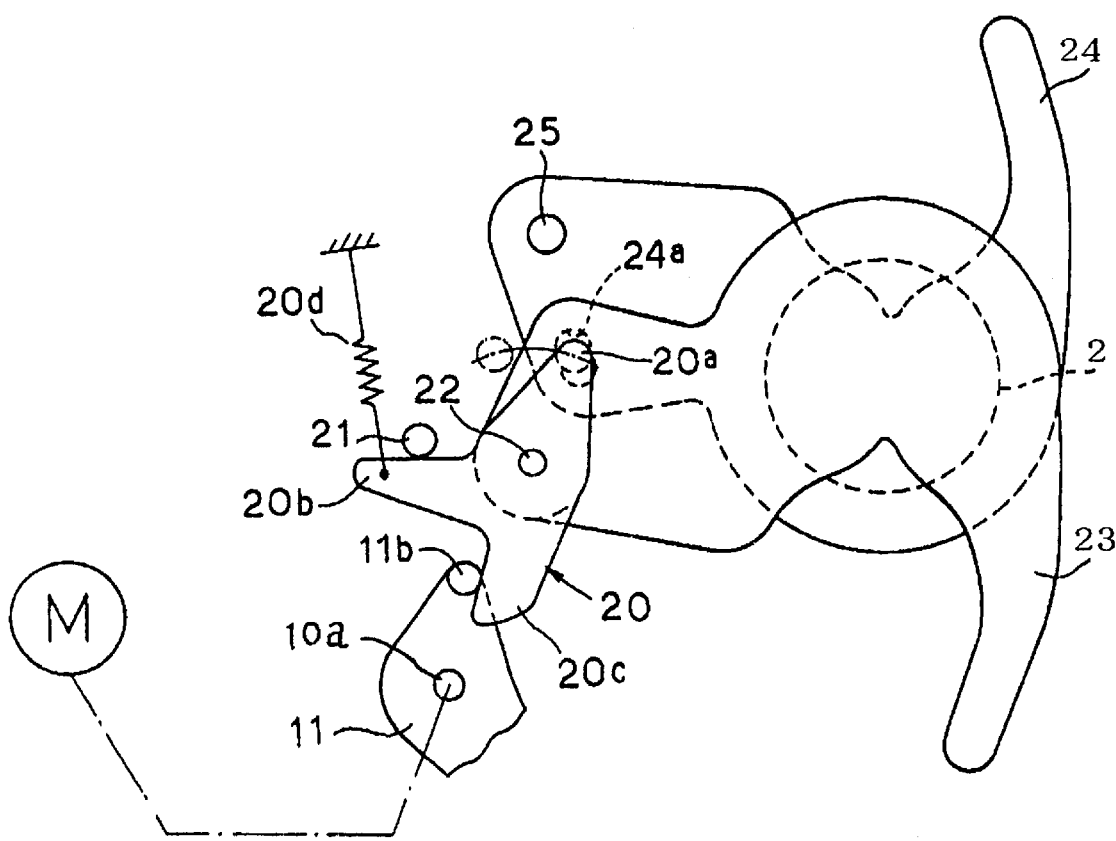
FIG. 2 is a front view of sectors and associated members therewith in the initial state of the shutter.

Sectors 23, 24, which are to be driven by rotation of the swing motor M and open and close a shutter aperture 2, are arranged symmetric about the shutter aperture 2 as shown in FIG. 2. The sector 24 is pivotably supported about a shaft 25 protruding on a not-shown main plate. The sector 23 is pivotably supported about a shaft 22 protruding on the main plate. On an upper surface of the sector 23, a sector open-close lever 20 is pivotably supported about the shaft 22. The sector open-close lever 20 has an arm 20b in engagement with an engagement pin 21 provided on the main plate. A sector open-close lever pin 20a of the sector open-close lever 20 is shaft-fixed to the sector 23 and in engagement with a groove 24a of the sector 24 to drive the sectors 23, 24. The sector open-close lever 20 is urged at all times in a clockwise direction by a spring 20d.

On a rotor shaft 10a of the rotor 10 shown in FIG. 1, a rotor-actuated lever 11 is press-fitted so that the rotor-actuated lever 11 rotates in unison with the rotor 10. A rotor-actuated lever pin 11a provided on the rotor-actuated lever 11 is in pivotable engagement about a shaft 12a projecting on the main plate. A diaphragm actuating member 12 is in rotatable abutment against a small diaphragm plate 3, hereinafter described, through a protrusion 12b and urged at all times in a counterclockwise direction by a spring 13.

In addition, an engagement pin 14 is provided on the main plate to prevent the diaphragm actuating member 12 from rotating in the counterclockwise direction when the rotor-actuated lever 11 rotates in the clockwise direction.

Furthermore, a rotor-actuation lever pin 11b provided on the rotor-actuated lever 11 shown in FIG. 2 is allowed to abut against the sector open-close lever 20. By rotating the rotor-actuated lever 11 clockwise, the sector open-close lever 20 is rotated counterclockwise so that the sector open-close lever 20 can actuate the sectors 23, 24.

The small-diaphragm plate 3 has a diaphragm aperture 3a smaller in diameter than the shutter aperture 2 in order to swiftly restrict an accurate diaphragm aperture for picture taking, and is pivotably supported about the shaft 4 protruding from the main plate. The small-diaphragm plate 3 has a shape that an outer peripheral shape distant from the shutter aperture 2 is arcuate somewhat greater than an arcuate of the shutter aperture 2 and an outer peripheral shape close to the shutter aperture 2 that is a concave arcuate portion 3d extending along the arcuate of the shutter aperture 2. A pin 3b provided standing on the small-diaphragm plate 3 is in engagement with a movable iron piece 18. The small-diaphragm plate 3 is urged clockwise at all times by a spring 3c and in abutment against a positioning pin 5 protruding from the main plate thus being kept in position.

The movable iron piece 18 is attracted to and released from an iron core 17a by tuning ON and OFF of an input signal to the coil 17b by an electromagnet unit 17. When the movable iron piece 18 is released from the iron core 17a without attraction to it, the small-diaphragm plate 3 is allowed to move to a first position A where the diaphragm aperture 3a comes in the shutter aperture 2. By attracting the movable iron piece 18 in this position to the iron core 17a, the small-diaphragm plate 3 is held not retractable from the shutter aperture 2. When the movable iron piece 18 is released from the attraction of the iron core 17a, movement is possible to a second position B where abutment is made against the positioning pin 5 by the spring 3c.

Because the small-diaphragm plate 3 in the first position A covering over the shutter aperture 2 does not entirely cover the shutter aperture 2 due to the concave-arcuate portion 3d, an auxiliary plate 28 is provided to cover this portion.

The auxiliary plate 28 is pivotably supported about the shaft 12a. The auxiliary plate 28 has a shape that cooperates with the small-diaphragm plate 3 to fully cover over the shutter aperture 2 and slightly overlaps the concave arcuate portion 3d of the small-diaphragm plate 3, and is positioned on an opposite side of the small-diaphragm plate 3 with respect to the shutter aperture 2. The auxiliary plate 28 is urged counterclockwise about the shaft 12a by a spring 28a. When the diaphragm actuating member 12 moves the small-diaphragm plate 3 to the first position A through a reception portion 3f by the protruding portion 12b, the pin 3e of the small-diaphragm plate 3 pushes a protruding portion 28b of the auxiliary plate 28 thereby causing the auxiliary plate 28 to follow the rotation of the small-diaphragm plate 3. When moving from the second position B shown by the solid line to the first position A shown by the two-dot-chain line, the small-diaphragm plate 3 and the auxiliary plate 28 can cooperate to cover over the entire shutter aperture 2.

The operation of the diaphragm device thus constructed will next be explained.

FIG. 1 and FIG. 2 show a state before operating the shutter. In this state, the electromagnet unit 17 is OFF, but the small-diaphragm plate 3 is restricted in rotation due to the clockwise bias force applied by the spring 3c and positioned by the positioning pin 5 and held in the second position B.

An explanation will be made of a case when a subject to be photographed is bright, so that a first program (shown by the broken line in FIG. 4) is selected for use whereby the shutter aperture 2 is limited to the smaller-diaphragm aperture 3a. The first program is selected by program select means 1 shown in FIG. 3.

Figure 3:
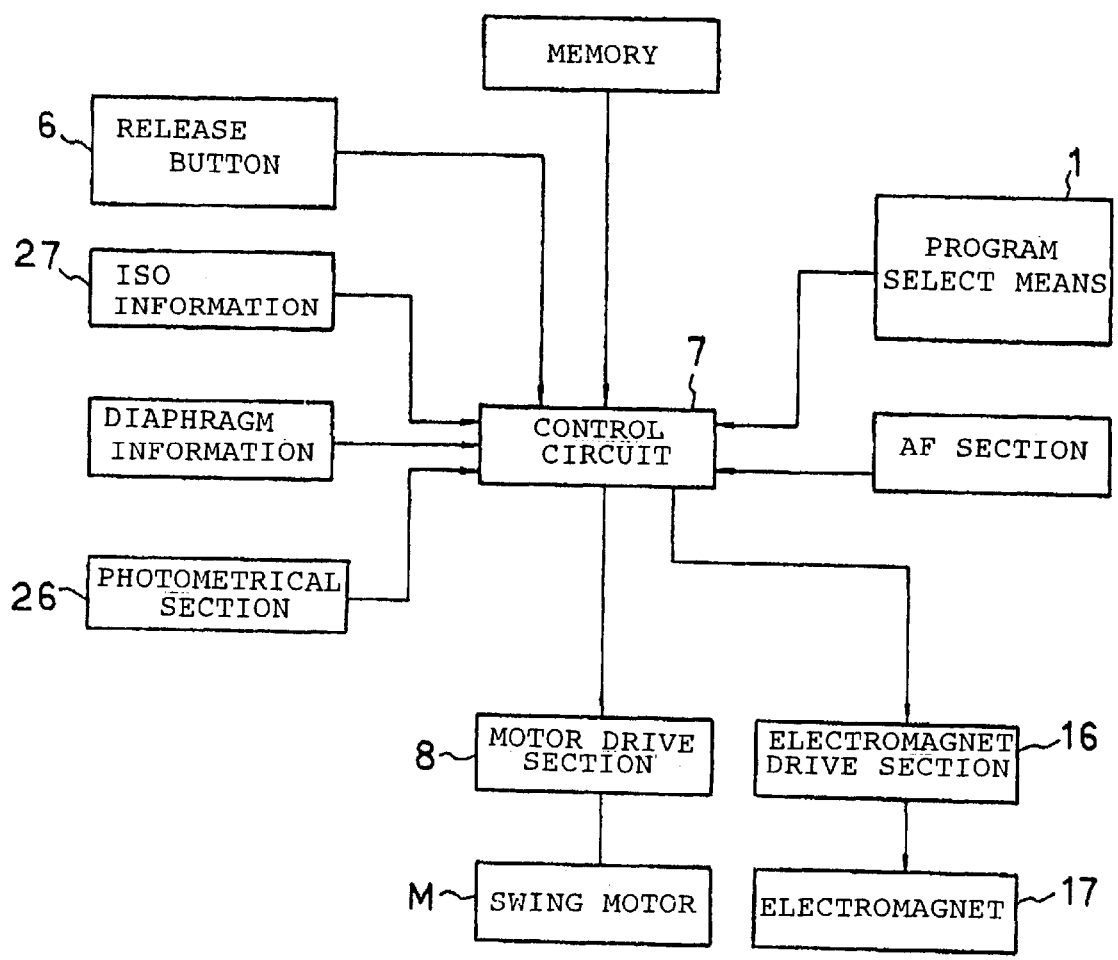
FIG. 3 is a control block diagram of the diaphragm device shown in FIG. 1 and FIG. 2.
Figure 4:
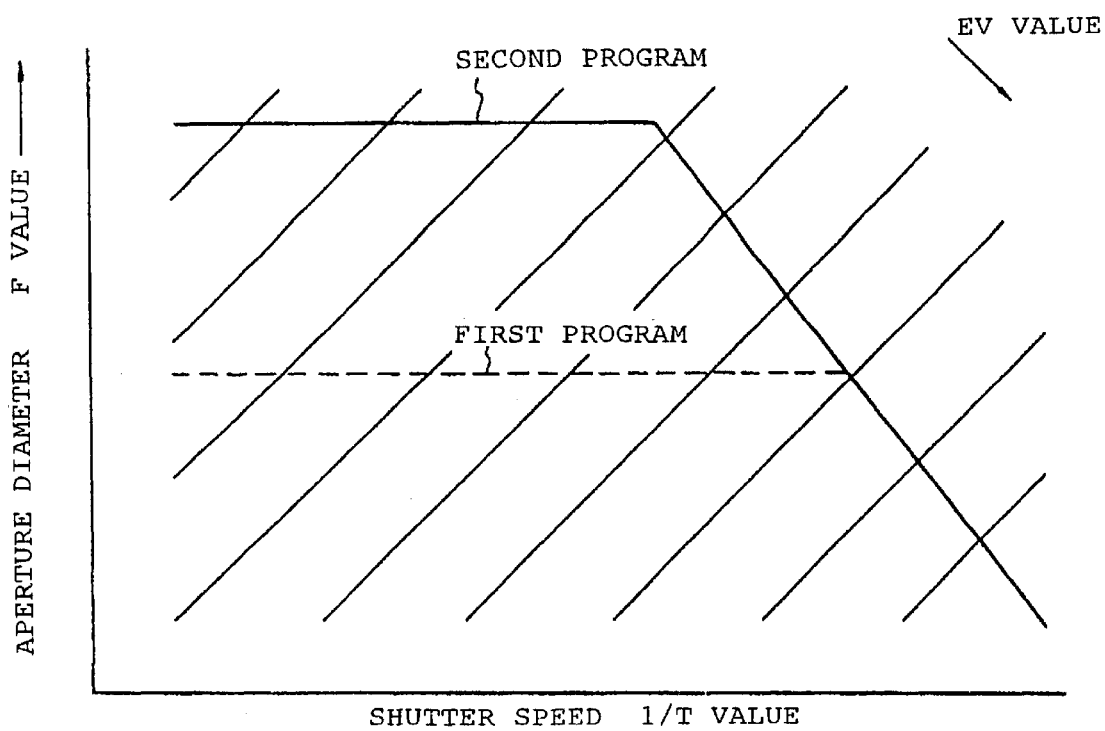
FIG. 4 is an Ev value diagram showing first and second programs.

At first, when a camera release button 6 shown in FIG. 3 is pressed, a control circuit 7 energizes the coil L shown in FIG. 1 in a reverse direction through a motor driving section 8. By energizing the coil L, an S pole is first generated in the magnetic pole portion 9a of the stator 9 and an N pole is generated in the magnetic pole portion 9b to rotate the rotor 10 in a counterclockwise direction. Because this causes the rotor-actuated lever 11 press-fitted on the rotor shaft 10a of the rotor 10 to be rotated in the counterclockwise direction, the small-diaphragm plate 3 also rotates in a counterclockwise direction through the diaphragm actuating member 12 engaging the rotor-actuated lever pin 11a of the rotor-actuated lever 11, and moves to a position A shown by the two-dot-chain line in FIG. 1 into abutment against the positioning pin 15. Also, a pin 3e of the small-diaphragm plate 3 pushes the protruding portion 28b of the auxiliary plate 28 and moves the auxiliary plate 28 to a position A shown by the two-dot-chain line in FIG. 1. The shutter aperture 2 is placed in a small-diameter state by cooperation of the small-diaphragm plate 3 and the auxiliary plate 28. In this state, the electromagnet unit 17 turns from OFF to ON, and the iron core 17a attracts and fixes the movable iron piece 18, holding the small-diaphragm plate 3 and auxiliary plate 28 in the first position A.

Next, the coil L is energized in a forward direction to cause the rotor 10 and the rotor-actuated lever 11 to begin rotating clockwise. However, the small-diaphragm plate 3 and the auxiliary plate 28 are kept in the state of the first position A because the pin 3b engages the movable iron piece 18.

When the rotor 10 continues to rotate clockwise, as shown in FIG. 2 the rotor-actuated lever pin 11b provided on the rotor-actuated lever 11 rotates clockwise and thereby begins abutting against the sector open-close lever 20, thereby rotating the sector open-close lever 20 in a counterclockwise direction. Due to this, the two sectors 23, 24 rotate oppositely to each other through the sector open-close lever pin 20a provided on the sector open-close lever 20, thereby staring exposure.

The sectors 23, 24 operate only for an exposure time determined by subject brightness information from a photometric section 26 shown in FIG. 3, aperture-sop information, film-sensitivity ISO information, etc. in the control circuit 7. Thereafter, the coil L is reverse energized, and the rotor-actuated lever 20 is rotated in a counterclockwise direction and returned to the state illustrated in FIG. 2.

Thereafter, the electromagnet unit 17 turns from ON to OFF. Due to this, the movable iron piece 18 is released, and the small-diaphragm plate 3 and the auxiliary plate 28 return from the first position A to the second position B by a force of the spring 3c, ending the exposure operation.

The above operation, if represented as a time chart separately for the sectors 23, 24, the electromagnet unit 17, the small-diaphragm plate 3 and the coil L, is as shown in FIG. 5(a).

Next, a description will be provided of a case in which the subject to be photographed is dark, so that a second program (shown by the solid line in FIG. 4) is selected for use whereby the shutter aperture is opened fully. the second program is selected by the program select means 1 shown in FIG. 3.

When the camera release button 6 is pressed, the control circuit 7 forwardly energizes the coil L shown in FIG. 1 through the motor driving section 8. By this energization, an N pole is generated in the magnetic pole portion 9a of the stator 9 and an S pole is generated in the magnetic pole portion 9b to rotate the rotor 10 in a clockwise direction. Due to this, because the rotor-actuated lever pin 11a and the diaphragm actuating member 12 are out of abutment and the diaphragm actuating member 12 remains in abutment against the engagement pin 14, the small-diaphragm plate 3 is kept in a waiting state in the second a position B due to a force of the spring 13. Also, the electromagnet unit 17 remains in the OFF state.

The sectors 23, 24 rotate to an exposure position as determined by the brightness information, etc. Thereafter, the coil L is reverse energized to rotate the rotor 10 in a reverse direction (counterclockwise) returning to the state of FIG. 2.

The above operation, if represented as a time chart separately for the sectors 23, 24, the electromagnet unit 17, the small-diaphragm plate 3 and the coil L, is as shown in FIG. 5(b).

Incidentally, in the above example, because the auxiliary plate 28 is positioned on a side of the shutter aperture 2 opposite the side on which the small-diaphragm plate 3 is positioned, the auxiliary plate 28 structurally moves to the first position A covering the shutter aperture 2 from the opposite side with respect to the small-diaphragm plate 3. However, the structure may be modified to provide for movement from the same direction without limitation to the foregoing example. This example will be next described based on FIG. 6 and FIG. 7.

Figure 6:
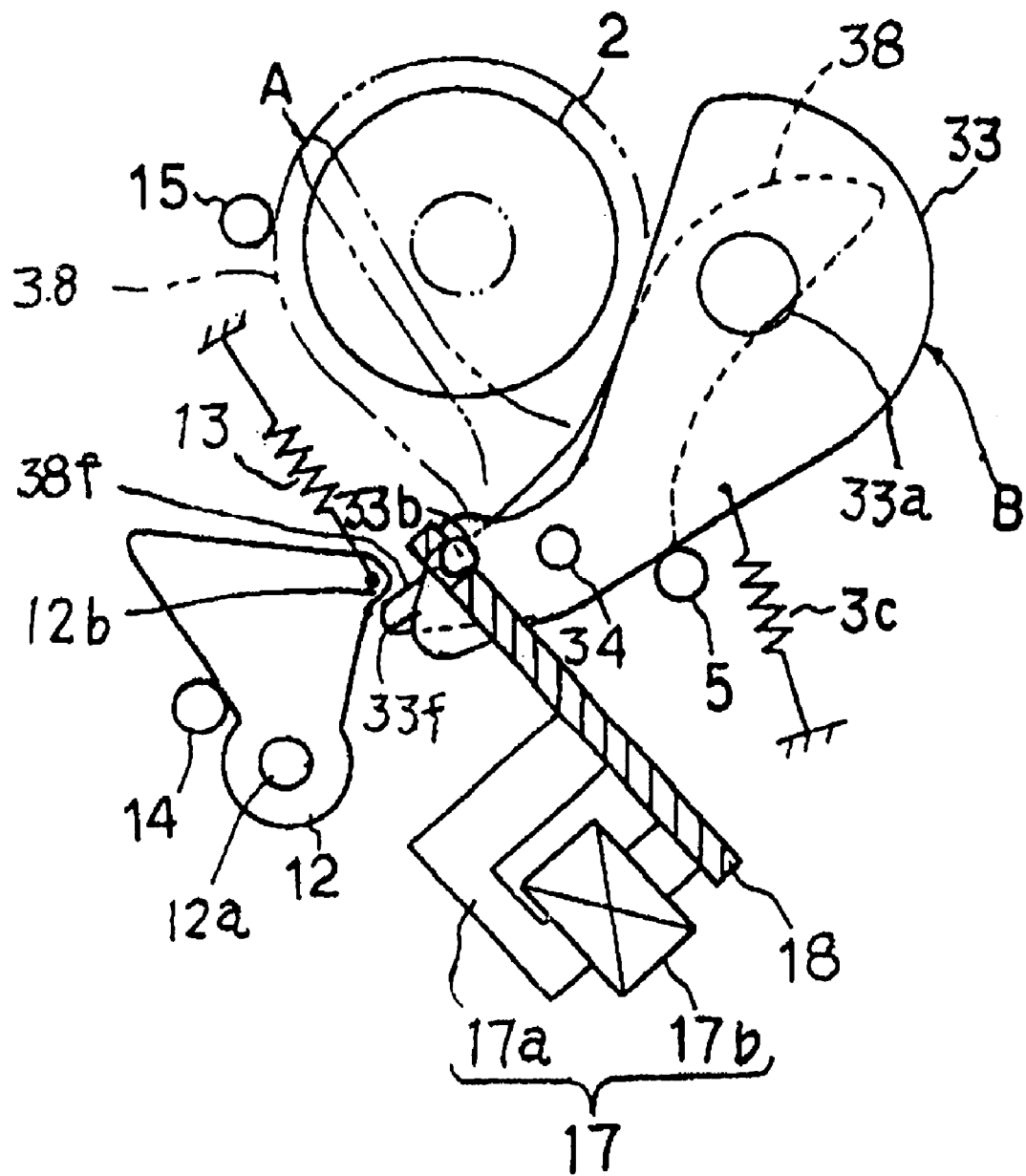
FIG. 6 is a front view showing an initial state prior to actuation of the shutter to which is applied a diaphragm device showing another embodiment of the invention.

First, in the embodiment of FIG. 6, on one side (right-hand side in the drawing) of an outer peripheral portion of the shutter aperture 2, a small-diaphragm plate 33 having a small diameter diaphragm aperture 33a and an auxiliary plate 38 are both pivotably supported on the same shaft 34. The small-diaphragm plate 33 is urged clockwise by a spring 3c. A protruding portion 12b of the diaphragm actuating member 12 first contacts a reception portion 38f of the auxiliary plate 38 and pushes it so that the auxiliary plate 38 is rotated in a counterclockwise direction and then contacts a reception portion 33f of the small-diaphragm plate 33 to rotate the small-diaphragm plate 33 in the counterclockwise direction. Then, the small-diaphragm plate 33 and the auxiliary plate 38 are simultaneously pushed and moved to a first position A shown by the two-dot-chain line. Other structural parts and methods of operation the same or similar to those of FIG. 1 are denoted by the same reference numerals.

Figure 7:
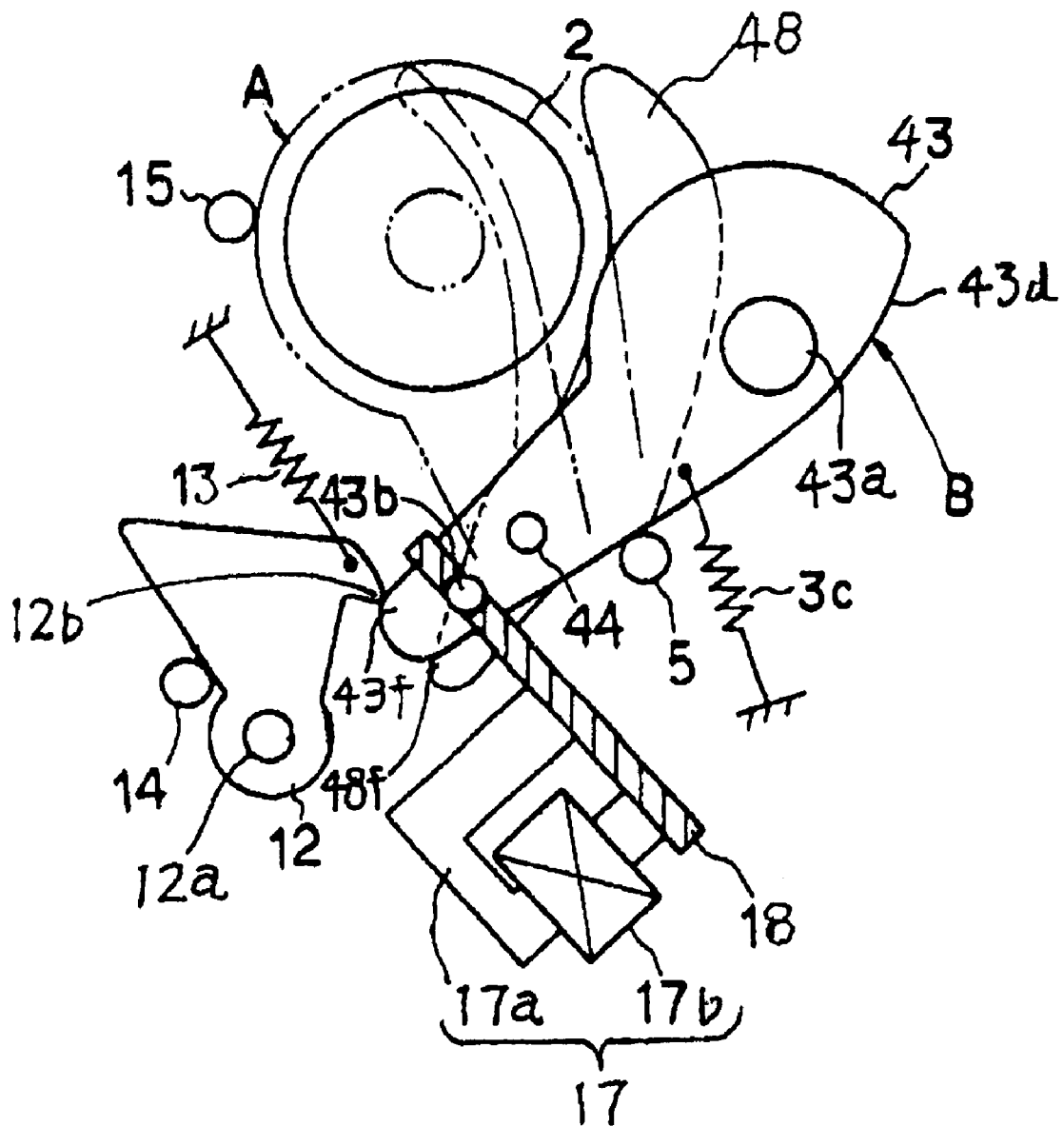
FIG. 7 is a front view showing an initial state prior to actuation of the shutter to which is applied a diaphragm device showing still another embodiment of the invention.

In the embodiment shown in FIG. 7, on one side (right-hand side in the drawing) outer peripheral portion of a shutter aperture 2, a small-diaphragm plate 43 having a small-diameter aperture 43a and an auxiliary plate 48 are both pivotably supported by the same shaft 44. The small-diaphragm plate 43 is urged clockwise by a spring 3c. The small-diaphragm plate 43 has a shape such that an outer peripheral portion on a side close to the shutter aperture 2 has an arcuate form with a diameter somewhat greater than an arc of the shutter aperture 2 and an outer peripheral portion distant from the shutter aperture 2 is formed as a cut-out outer peripheral portion 43d. The auxiliary plate 48 is nearly in a bow-like shape which is a shape for cooperating with the outer peripheral portion 43d to cover over the shutter aperture 2. Accordingly, a protruding portion 12b of the diaphragm actuating member 12 first contacts a reception portion 43f of the small-diaphragm plate 43 and pushes it to pivot in the counterclockwise direction, and contacts a reception portion 48f of the auxiliary plate 48 with a slight delay of time. Thereafter, the small-diaphragm plate 43 and the auxiliary plate 48 are simultaneously pushed and pivoted in the counterclockwise direction to a first position A shown by the two-dot-chain line. Other structural parts and operation methods the same or similar to those shown in of FIG. 1 are denoted by the same reference numerals.

Although the above embodiments are provided to illustrate the example, the invention is not limited thereby and many modifications or changes may be made without departing from the scope of the invention. For instance, although the diaphragm actuating member is moved by a motor in the foregoing embodiments, the invention is not so limited and manual operation may be used. In addition, the diaphragm device of the invention is usable not only for a photographic camera using a film or charge coupled device but also for a video camera or the like.

Because the shutter aperture can be changed over between the large-diameter aperture and the small-diaphragm aperture and the switching is structurally performed by the cooperation of the two or more members, i.e. the small-diaphragm plate and the auxiliary plate, the small-diaphragm plate can be made smaller than in the related device. It is possible to reduce the space around the shutter aperture where the small-diaphragm plate retracts from the shutter aperture and to achieve a size reduction in the device. Also, the freedom of part shape or arrangement is improved.

What is claimed is:

1. A diaphragm device comprising: a shutter having a shutter aperture; a small-diaphragm plate having a diaphragm aperture smaller in diameter than the shutter aperture and movable between a first position at which the diaphragm aperture is positioned within the shutter aperture and a second position at which the diaphragm aperture is not within the shutter aperture; an auxiliary plate cooperating with the small-diaphragm plate to cover the shutter aperture and being movable between a first position at which the auxiliary plate is positioned within the shutter aperture and a second position at which the auxiliary plate is not within the shutter aperture; and a diaphragm actuating member for actuating at least one of the small-diaphragm plate and the auxiliary plate; wherein actuation of the diaphragm actuating member in a first direction causes the small-diaphragm plate and the auxiliary plate to be moved to the first positions to cover the shutter aperture, and actuation of the diaphragm actuating member in a second direction opposite the first direction causes the small-diaphragm plate and the auxiliary plate to be moved to the second positions retracted from the shutter aperture.

2. A diaphragm device according to claim 1; wherein the small-diaphragm plate is adjacent a first side of the shutter aperture when in the second position, and the auxiliary plate is positioned adjacent a second side of the shutter aperture opposite the first side when in the second position.

3. A diaphragm device according to claim 2; wherein a driven one of the small-diaphragm plate and the auxiliary plate engages the other one of the small-diaphragm plate and the auxiliary plate so that the two plates are movable together as a unit between the first and second positions and actuation of the diaphragm actuating member in one direction is conveyed through the driven one of the small-diaphragm plate and the auxiliary plate to the other one of the small-diaphragm plate and the auxiliary plate.

4. A diaphragm device according to claim 1; wherein the small-diaphragm plate is adjacent a first side of the shutter aperture when in the second position, and the auxiliary plate is positioned adjacent the first side of the shutter aperture when in the second position.

5. A diaphragm device according to claim 4; wherein a driven one of the small-diaphragm plate and the auxiliary plate engages the other one of the small-diaphragm plate and the auxiliary plate so that the two plates are movable together as a unit between the first and second positions and actuation of the diaphragm actuating member in one direction is conveyed through the driven one of the small-diaphragm plate and the auxiliary plate to the other one of the small-diaphragm plate and the auxiliary plate.

6. A diaphragm device according to claim 1; wherein a driven one of the small-diaphragm plate and the auxiliary plate engages the other one of the small-diaphragm plate and the auxiliary plate so that the two plates are movable together as a unit between the first and second positions and actuation of the diaphragm actuating member in one direction is conveyed through the driven one of the small-diaphragm plate and the auxiliary plate to the other one of the small-diaphragm plate and the auxiliary plate.

7. A diaphragm device according to claim 1; wherein actuation of the diaphragm actuating member in one direction is conveyed through one of the small-diaphragm plate and the auxiliary plate to the other one of the small-diaphragm plate and the auxiliary plate to move both of the plates between the first and second positions as one unit.

8. A diaphragm device according to claim 1; further comprising a motor for driving the diaphragm actuating member.

9. A diaphragm device according to claim 8; wherein the motor comprises a fixed shaft, a rotor rotatably supported by the fixed shaft, a permanent magnet surrounding the rotor to cause the rotor to undergo rotation in a clockwise or counterclockwise direction in response to an applied energy of a given polarity, a coil for energizing the rotor; and a rotor actuated lever supported by the shaft so as to be driven with the rotor and having a protrusion formed thereon; wherein the diaphragm actuating member is pivotably supported by a shaft adjacent the rotor actuating member and has a portion engageable with the protrusion formed on the rotor actuated lever so as to be pivoted by the rotor actuated lever.

10. A diaphragm device according to claim 1; further comprising biasing means for biasing the small-diaphragm plate and the auxiliary plate in one of the first and second positions.

11. A diaphragm mechanism comprising: a shutter having a shutter aperture; an aperture-reducing mechanism having an aperture formed therethrough, the aperture having a smaller diameter than the shutter aperture, and being settable in a first position at which the aperture is positioned within the shutter aperture and the aperture-reducing mechanism fully covers the shutter aperture and a second position at which the aperture is not positioned within the shutter aperture and the aperture-reducing mechanism does not cover the shutter aperture; and an actuating member for actuating the aperture-reducing mechanism to selectively alternate between the first and second positions; wherein actuation of the aperture-reducing mechanism in one direction causes it to be placed in the first position and actuation of the aperture-reducing mechanism in an opposite direction causes it to be placed in the second position.

12. A diaphragm mechanism according to claim 11; wherein the aperture-reducing mechanism comprises a small-diaphragm plate having the aperture formed therethrough and an auxiliary plate formed separately from the small-diaphragm plate and cooperating therewith to selectively cover the shutter aperture.

13. A diaphragm mechanism according to claim 12; wherein the small-diaphragm plate and the auxiliary plate are each pivotably mounted to undergo pivotal movement between the first and second positions.

14. A diaphragm mechanism according to claim 12; wherein the small-diaphragm plate is pivotably mounted to a first shaft so that it is disposed on a first side of the shutter aperture when in the second position, and the auxiliary plate is pivotably mounted to a second shaft so that it is disposed on a second side of the shutter aperture opposite the first side when it is in the second position.

15. A diaphragm mechanism according to claim 12; wherein the small-diaphragm plate is pivotably mounted to a first shaft so that it is disposed on a first side of the shutter aperture when in the second position, and the auxiliary plate is pivotably mounted to the first shaft so that it is disposed on the first side of the shutter aperture when it is in the second position.

16. A diaphragm mechanism according to claim 12; wherein actuation of the diaphragm actuating member in one direction is conveyed through one of the small-diaphragm plate and the auxiliary plate to the other one of the small-diaphragm plate and the auxiliary plate to move both of the plates between the first and second positions as one unit.

* * * * *